United States Patent [19]

Guest

[11] Patent Number: 5,468,027
[45] Date of Patent: Nov. 21, 1995

[54] TUBE COUPLINGS

[76] Inventor: John D. Guest, 'Iona', Cannon Hill Way, Maindenhead, Berkshire, United Kingdom

[21] Appl. No.: 389,782

[22] Filed: Feb. 14, 1995

[30] Foreign Application Priority Data

Feb. 14, 1994 [GB] United Kingdom ............... 9402758

[51] Int. Cl.$^6$ ..................................... F16L 39/00
[52] U.S. Cl. ..................... 285/319; 285/322; 285/906
[58] Field of Search .................... 285/322, 323, 285/319, 921, 340, 906

[56] References Cited

U.S. PATENT DOCUMENTS

| | | | |
|---|---|---|---|
| 4,005,883 | 2/1977 | Guest | 285/322 |
| 4,013,310 | 3/1977 | Dye | 285/319 X |
| 4,178,023 | 12/1979 | Guest | 285/323 |
| 4,573,716 | 3/1986 | Guest | 285/323 |
| 4,943,091 | 7/1990 | Bartholomew | 285/319 X |
| 5,067,754 | 11/1991 | Bartholomew | 285/319 |
| 5,161,833 | 11/1992 | McNaughton et al. | 285/319 |
| 5,370,423 | 12/1994 | Guest | 285/39 |

*Primary Examiner*—Dave W. Arola
*Attorney, Agent, or Firm*—Baker & Daniels

[57] ABSTRACT

A tube coupling comprising a coupling body having a throughway open at one end to receive an end part of a tube, sealing elements in the throughway to form a sealing engagement with the end part of the tube located in the throughway, a locking device in the form of a collet engageable with an annular bead on the tube adjacent to the end part of the tube to hold the end part of the tube in the coupling body in engagement with the sealing elements and a projection or projections to provide a resistance to entry of the tube into the throughway prior to engagement of the collet with the tube bead so that a force applied to the tube to overcome the resistance also overcomes any resistance offered by the locking device to ensure that the tube bead is engaged with the locking device.

10 Claims, 6 Drawing Sheets

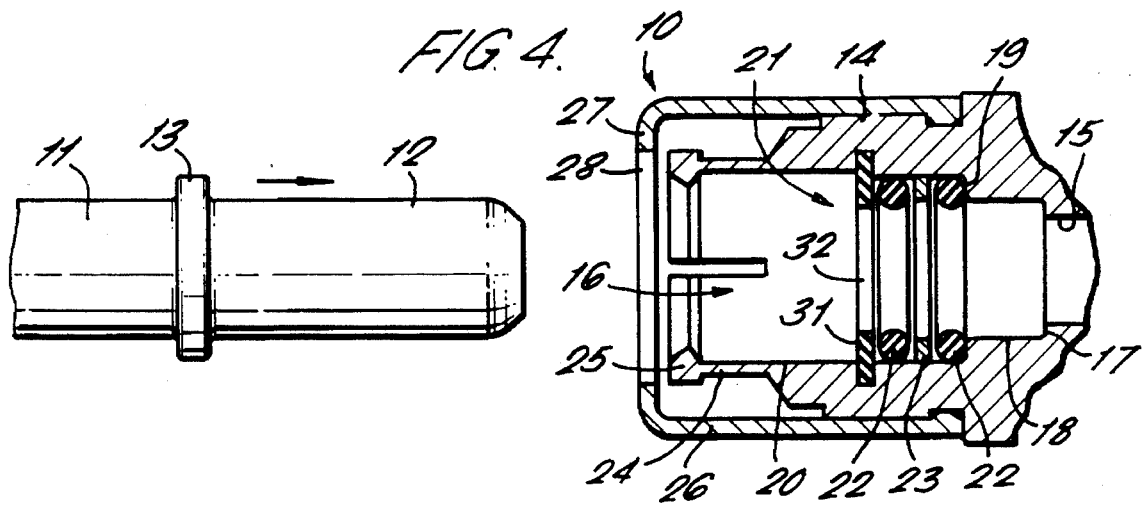
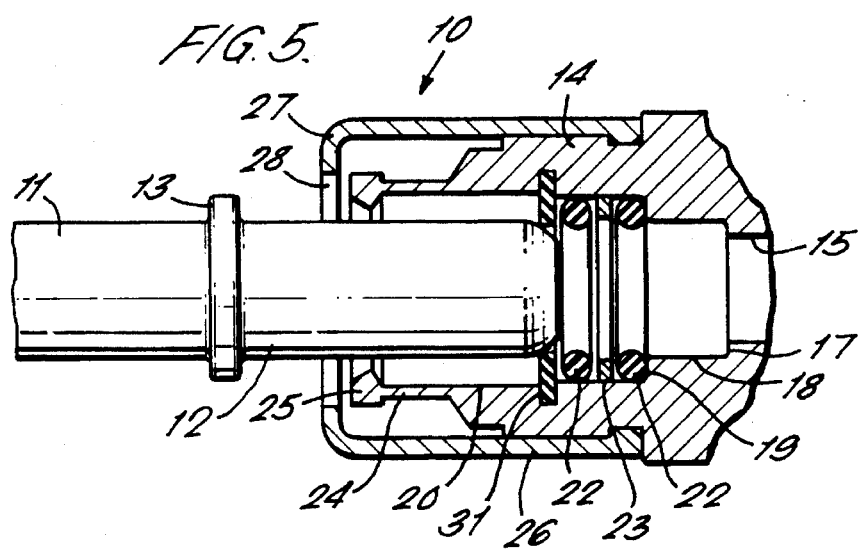
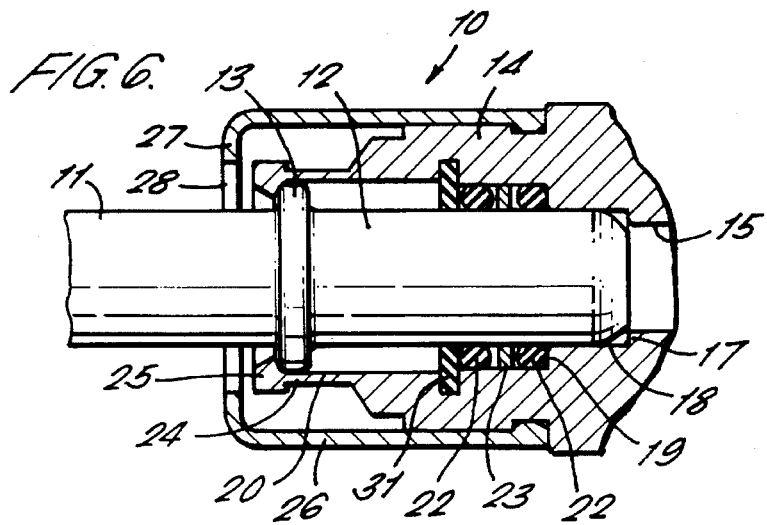

TUBE COUPLINGS

BACKGROUND OF THE INVENTION

1. Field of the Invention

This invention relates to tube couplings.

2. Background Prior Art

More particularly, the invention is concerned with tube couplings comprising a coupling body having a throughway open at one end to receive an end part of the tube, sealing means in the throughway to form a sealing engagement with the end part of the tube located in the throughway, and a locking device engageable with an annular bead on the tube adjacent to said end part to hold the end of the tube in the coupling body in engagement with said sealing means. A problem which can arise with such an arrangement is that a tube can be pushed into the coupling body and the resistance offered to entry of the tube by the seal may appear to indicate to the operator that the tube has been locked in the coupling body but this may not be so and the bead on the tube may not have engaged the locking device. Thus, when pressure is applied to the coupling, the tube may be simply blown out of the coupling resulting in loss of fluid and potential danger where the fluid is either flammable or corrosive.

SUMMARY OF THE INVENTION

This invention provides a tube coupling comprising a coupling body having a throughway open at one end to receive an end part of a tube, sealing means in the throughway to form a sealing engagement with the end part of the tube located in the throughway, a looking device engageable with an annular bead on the tube adjacent to the end part of the tube to hold the end part of the tube in the coupling body in engagement with said sealing means and means on the body to provide a resistance to entry of the tube into the throughway prior to engagement of the locking device with the tube bead so that a force applied to the tube to overcome the resistance also overcomes any resistance offered by the locking device to ensure that the tube bead is engaged with the locking device.

The means to provide a resistance to entry of the tube into the throughway may comprise a deformable member located in the throughway in the path of the tube between said sealing means and said open end of the throughway to be engaged and deformed by entry of the tube and thereby to provide resistance to entry of the tube.

More specifically the deformable member may comprise an annular component mounted in the throughway between said sealing means and the open end of the throughway and having a inner peripheral portion engageable with the tube to be deformed thereby, For example the annular element may be of simple diaphragm form having a plain inner periphery to be deformed by the tube passing through the element.

In another embodiment the annular element may be of diaphragm form having spaced fingers or teeth around its inner periphery which are deformed by the tube passing through the annular element.

In a further arrangement the annular element may have arcuate slots between its inner and outer peripheries to allow deformation of the element when the tube is passed through the element.

More specifically the element may have an oval shaped inner aperture to be deformed by the tube passing through the element.

Alternatively the annular element may have an internal diameter smaller than the outside diameter of the tube whereby the inner portion of the element is deformed by passing the tube through the annular element.

In a further arrangement according to the invention the locking device for holding the tube in the coupling body may comprise a annular collet mounted on the coupling body having resilient fingers projecting outwardly of the coupling body to engage over and snap behind the bead on the tube to retain the tube in the coupling body, the annular portion of the collet having an internal diameter less than that of the outside diameter of the tube to provide said resistance to entry of the tube into the throughway in the coupling body.

In the latter case the collect may be of dual form, having one set of resilient fingers projecting into the coupling body for engagement with a tapered cam surface in the coupling body to grip and engage the tube within the coupling body and a second set of fingers projecting outwardly of the coupling body to engage and lock with the bead on the tube.

BRIEF DESCRIPTION OF THE DRAWINGS

FIG. 4 shows the coupling body of FIG. 3 and a tube to be located in the coupling body;

FIG. 5 shows the tube and coupling body of FIG. 4 with the tube partially inserted into the coupling body;

FIG. 6 shows the tube and coupling body of FIG. 4 with the tube fully inserted in the coupling body;

DESCRIPTION OF THE PREFERRED EMBODIMENT

Figure 1:
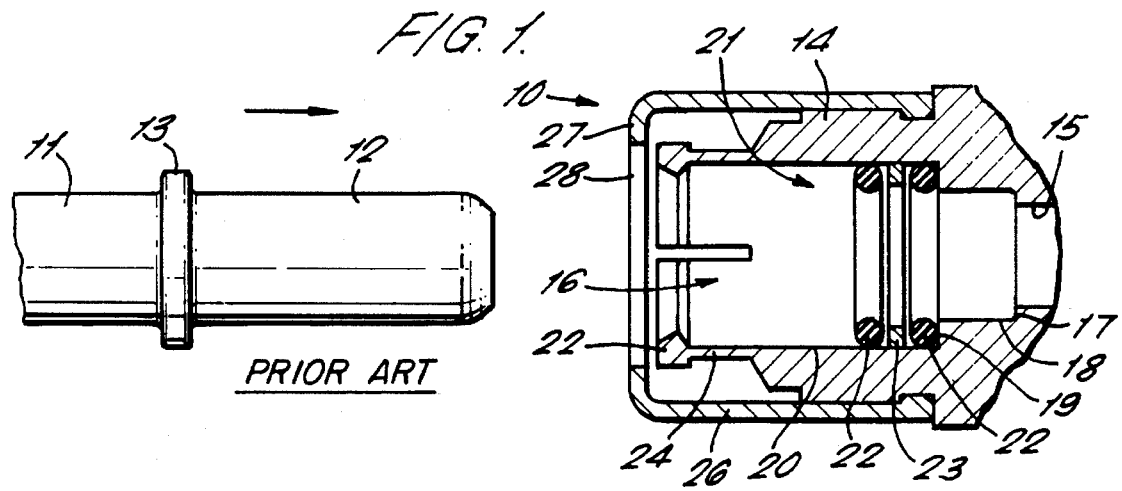
FIG. 1 is a diagrammatic view of a known form of coupling body and tube prior to assembly of the tube in the coupling body.
Figure 2:
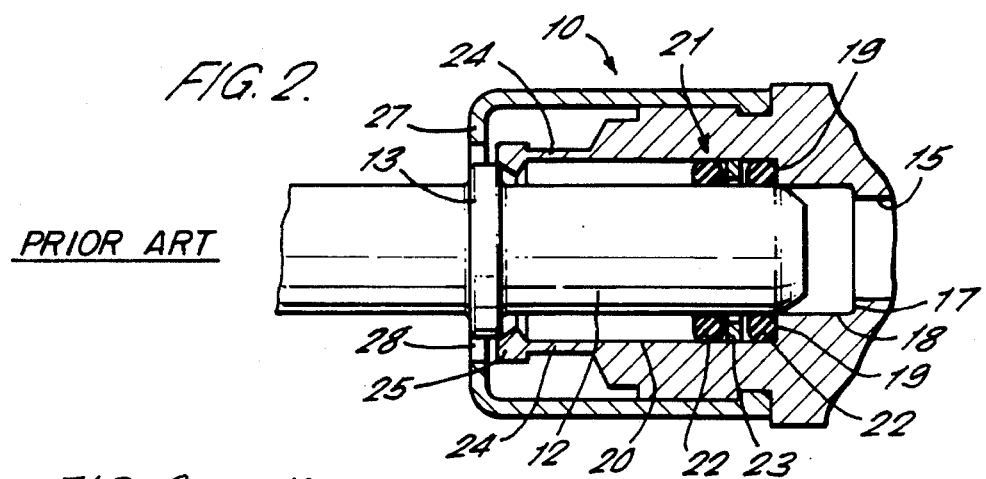
FIG. 2 is a diagrammatic view of a coupling and tube of FIG. 1 shown partly assembled.

Reference is made firstly to FIGS. 1 and 2 of the drawings which show a tube coupling indicated generally at 10 and a tube 11 to be engaged in the coupling. The tube 11 has an end part 12 which is inserted into the coupling and an integral annular bead 13 encircling the tube adjacent the end part to engage with a locking device in the coupling to hold the tube in engagement in the coupling.

The coupling comprises a coupling body 14 having a throughway 15 having an enlarged open end 16 to receive the end part 12 of the tube. The diameter of the throughway is increased at a first step 17 facing towards the open end of the throughway to form a first enlarged section 18 and by a second step 19 also facing towards the open end of the throughway to form a second enlarged section 20. The diameter of the first enlarged section 18 corresponds to that of the end part 12 of the tube so that when the tube is inserted in the coupling body, the end of the tube engages in the enlarged section 18 and abuts the step 17.

The second enlarged section 20 of the coupling body contains a seal assembly indicated generally at 21 lying in engagement with the shoulder 19 and comprising a pair of O-ring seals 22 separated by a washer 23. The seals are dimensioned to engage the outer surface of the end part 12 of the tube when the latter is inserted in the coupling body to form a fluid tight seal therewith.

The end part of the coupling body is formed with an integral collet comprising resilient arms 24 which extend axially over the coupling body and terminate in heads 25 which are shaped to snap over and engage behind the raised bead 13 on the tube when the latter is inserted in the coupling body. The coupling body/collet are enclosed in an end cap 26 the end wall 27 which extending over the collet is formed with an aperture 28 to receive the pipe 11.

FIG. 2 of the drawings illustrate the coupling body with the tube 11 partially engaged.

Figure 3:
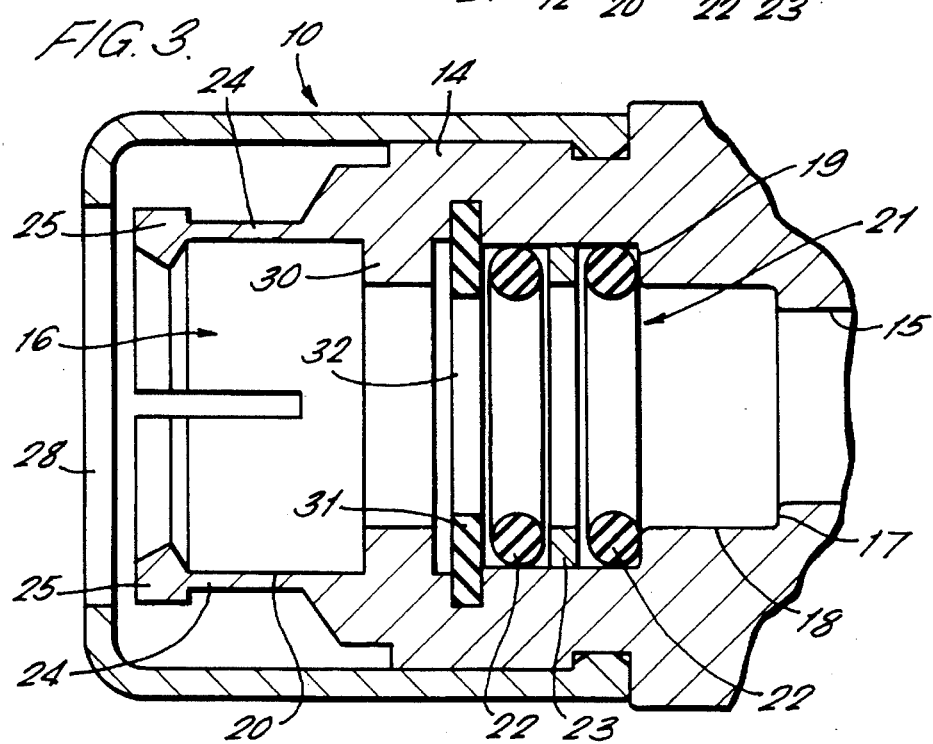
FIG. 3 is a diagrammatic view of a coupling body similar to that of FIG. 1 modified to incorporate the present invention.

The end part 12 of the tube is inserted into the coupling body through the collet 24 into the second enlarged section 20 and through the seal assembly 21. The seal assembly provides some resistance to insertion of the tube as the seals grip the surface of the tube which may result in the assembly believe, mistakenly, that the tube has been fully engaged in the coupling whereas the bead 13 of the tube has not been snapped through the heads 25 of the collet as is apparent from FIG. 2. This may not be visually apparent because the bead 13 is within the end cap. If a significant pressure where applied to the fluid within the tube/coupling, there would be a serious risk that the tube would be blown out of the coupling resulting in an escape of fluid at pressure. This could be particularly dangerous in the case of an inflammable fluid such as petrol in a fuel line in a motor vehicle or a chemically corrosive fluid. Reference is now made to FIG. 3 of the drawings which illustrates a modified form of the coupling of FIGS. 1 and 2 adapted to overcome the above difficulties.

Figure 7:
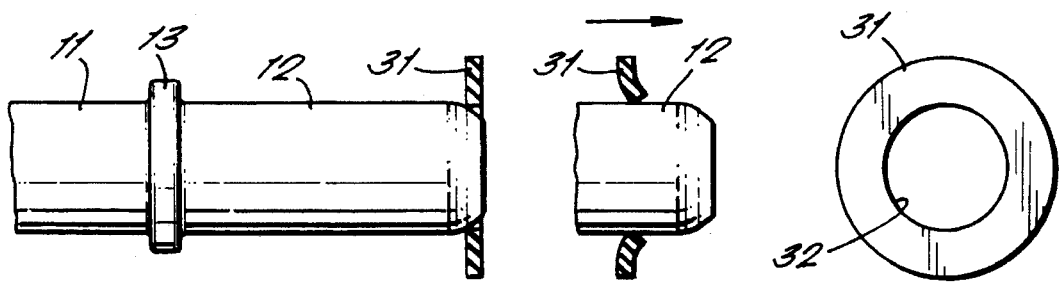
FIGS. 7 to 9 are diagrammatic illustrations of tubes and various different forms of annular resistance elements.

Firstly the second section 20 of the throughway in the coupling body is formed with an integral annular guide 30 adjacent the open end 16 of the coupling body to align the end part 12 with the tube with the seal assembly and section 18. An annular deformable diaphragm 31 is mounted on the wall of the coupling body between the guide 30 and seal assembly and has an internal diameter 32 which is less than the outside diameter of the end part 12 of the tube. Thus, when the tube is inserted in the coupling body, the tube deforms the inner part of the diaphragm 31 as shown in FIG. 7 of the drawings as it passes through the diaphragm thus a positive resistance to entry of the tube is provided by the diaphragm which requires a significant force from the assembler to overcome. Once the diaphragm has been deformed, the tube can slide through the diaphragm and then the seal assembly 21 into the section 18 of the throughway but the force applied to "break through" the diaphragm is sufficient to carry the tube fully into the coupling body snapping the bead 13 through the heads 25 of the collet 24 to retain the tube positively in the coupling body. The sequence of the assembly of the tube in the coupling body is shown in FIGS. 4, 5 and 6.

Figure 8:
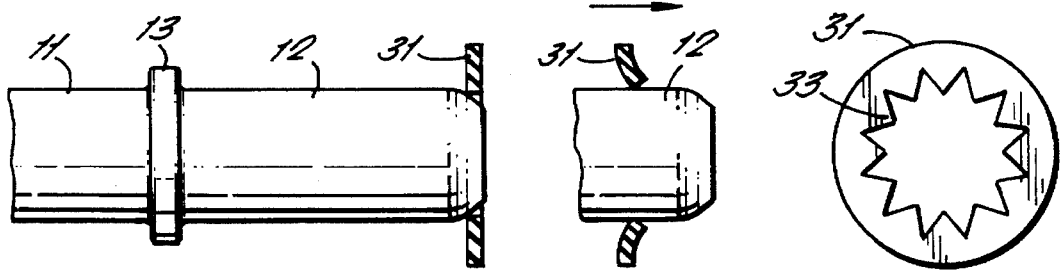

FIG. 8 shows a further form of diaphragm in which the inner periphery is formed with spaced teeth 33 which are deflected or deformed by the insertion of the end part of the tube as illustrated.

Figure 9:
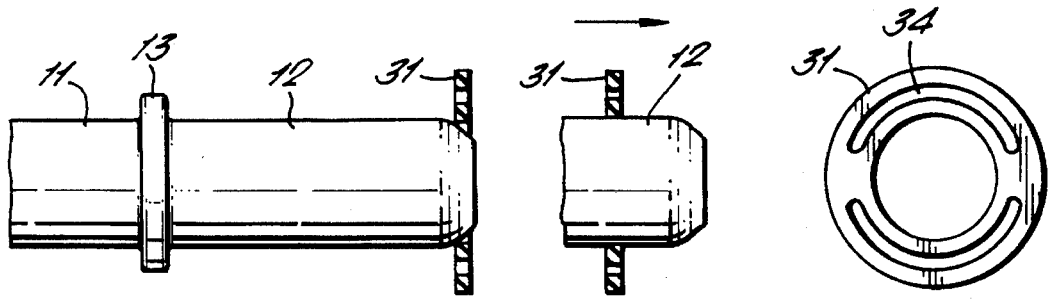

FIG. 9 shows a further arrangement in which the diaphragm 31 is formed with a spaced pair of arcuate slots 34 within its wall thickness at diametrically opposite locations.

The slots allow the inner part of the diaphragm to be displaced immediately outwardly by the tube as it is driven through the diaphragm closing up the slots as illustrated. The inner opening of the diaphragm may be circular or oval shaped.

Figure 10:
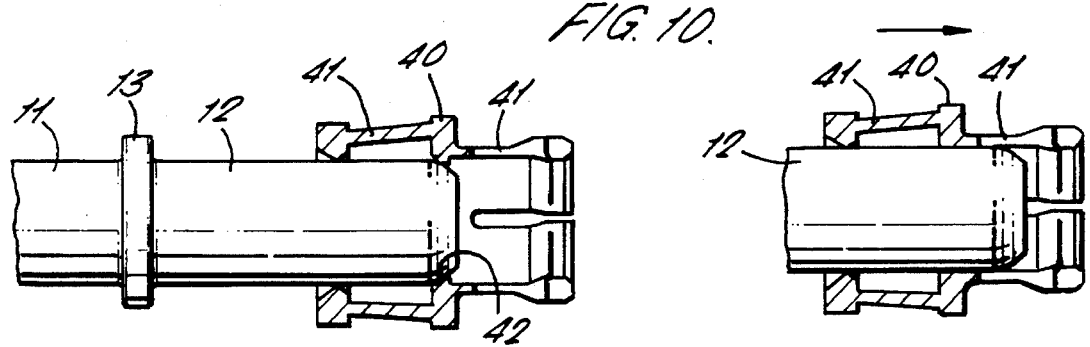
FIG. 10 is a diagrammatic illustration of a dual form collet modified to provide resistance to entry of the tube with a tube partially and more fully inserted into the collet.
Figure 11:
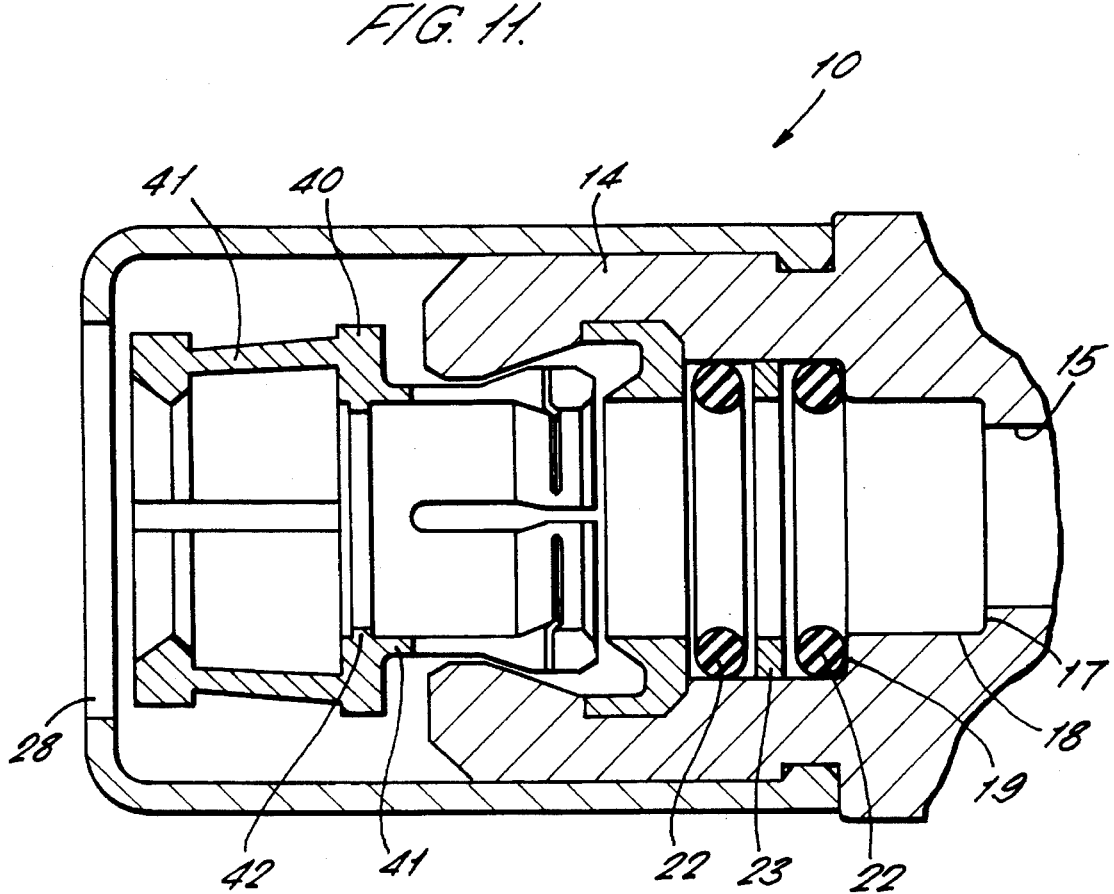
FIG. 11 shows the collet of FIG. 10 incorporated in a tube coupling body.

FIG. 10 of the drawings shows an application of the invention to the dual collet form described and illustrated in our UK Patent Application No 9400585.7. The central annular portion 40 to which the two sets of collet arms 41 are mounted has a restricted opening provided by an annular shoulder 42. Pressing the tube end 12 through the collet deforms the shoulder as illustrated in FIG. 10. FIG. 11 of the drawings shows the dual collet of FIG. 10 assembled on a coupling body ready for insertion of the tube.

Figure 12:
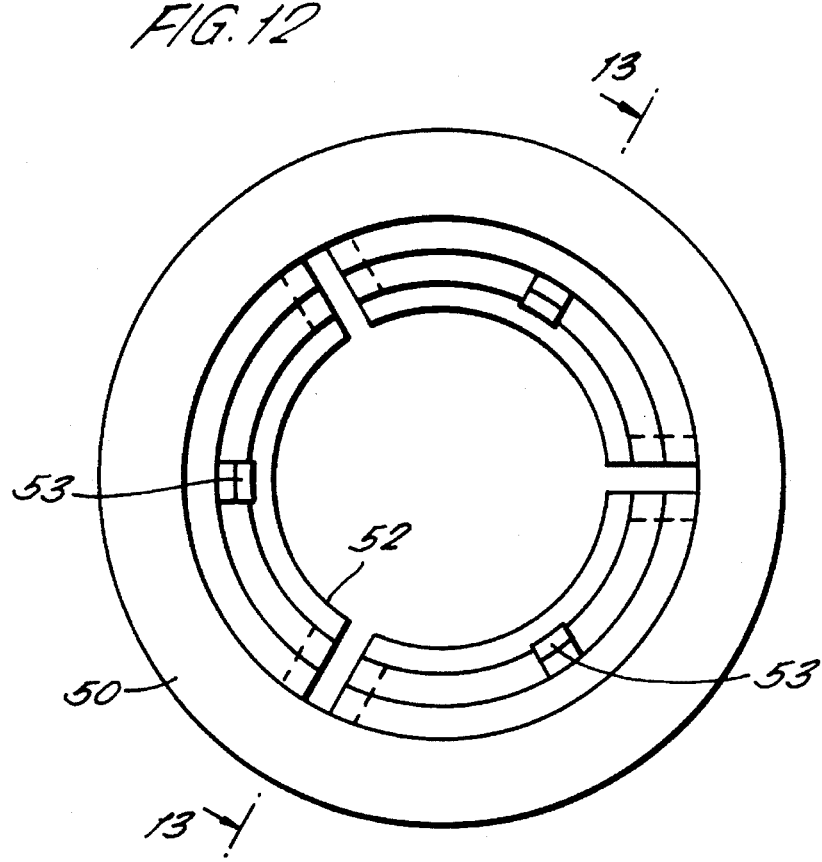
FIGS. 12 to 15 show various further arrangements.
Figure 13:
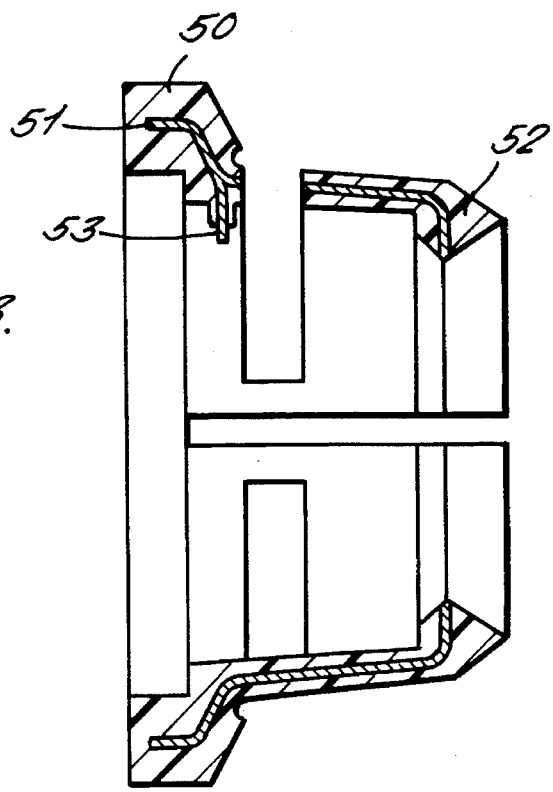

FIGS. 12 and 13 show a further form of collet described in greater detail in our UK Patent Application No 9419003.0 in which a skeletal metal insert 50 is embodied. The insert has an annular part 51 embodied in the annular part of the collet and integral arms 52 embodied in the arms of the collet. Inturned tabs are formed on the annular part which extend through the inner surface of the collet at spaced locations around the collet to provide the resistance to insertion in a tube through the collet. The tabs are encapsulated in the plastics of the collet to prevent scratching of the tube surface. The tabs remain in tact and functional even when the plastics of the collet has been destroyed by heat or chemical action.

Figure 14:
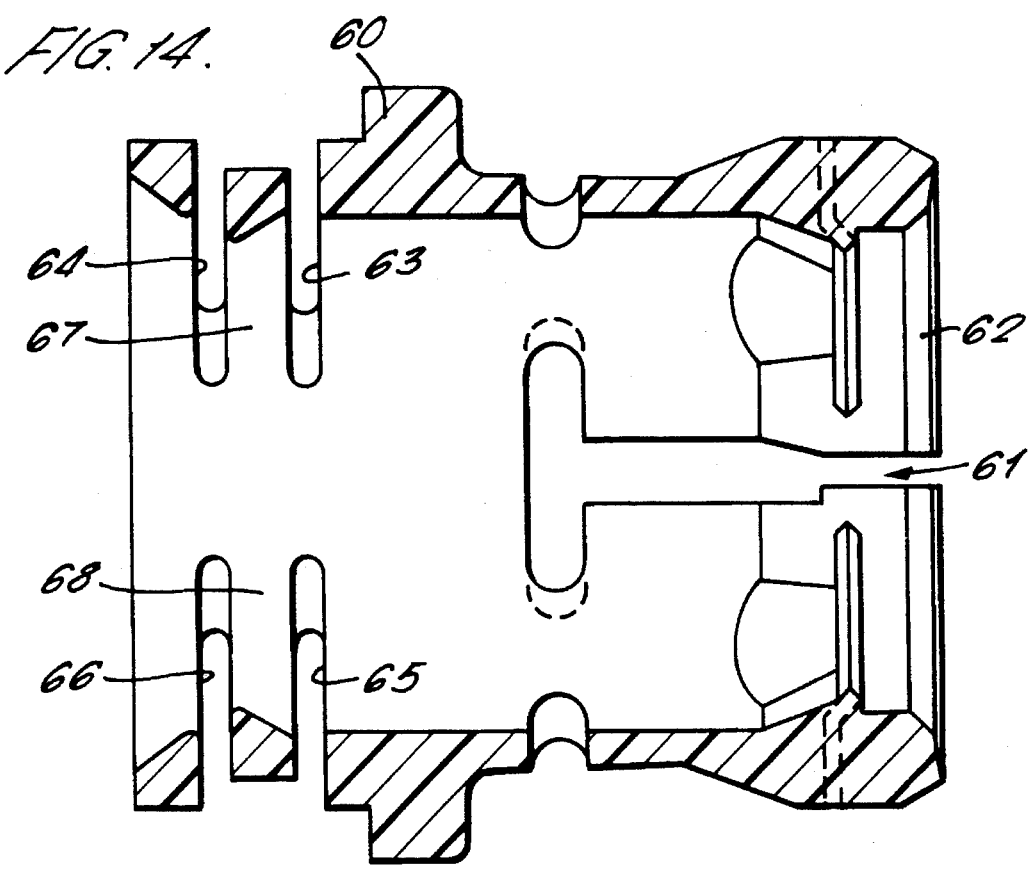
Figure 15:
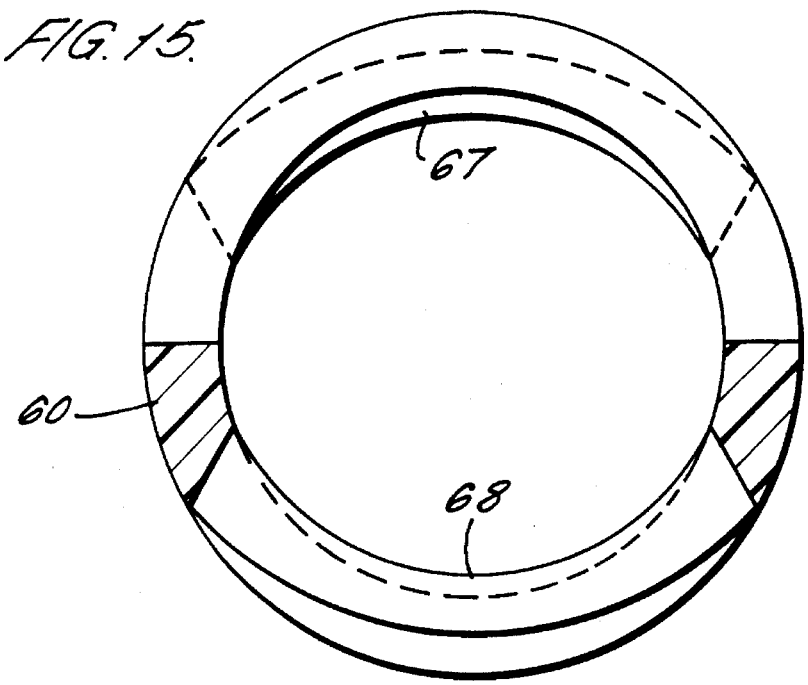

FIGS. 14 and 15 show a further modified form of the collet of FIG. 10.

The collet of FIGS. 14 and 15 is formed as a plastics moulding and comprises an annular part 60 having longitudinal slots 61 at one end to form resistent arms 62 to engage and grip a tube in the collet. The annular part of the collet is formed with pairs of circumferentially extending slots 63, 64 and 65, 66 at diametrically opposed locations across the collet. The wall portions 67, 68 within the slots are flexible and are moulded to a larger radius than that of the remainder of the collet so that they project into the interior of the collet as best seen in FIG. 15. The wall portions provide an obstruction to the entry of a tube through the collet until the tube is formed into the collet spreading the wall portions 67, 68 apart. The arrangement thus provides a positive resistance to entry of a tube until sufficient force is applied to drive the tube through the collet fully into the coupling body in which it is located as described in connection with the other embodiments above.

I claim:

1. A tube coupling comprising a coupling body having a throughway open at one end to receive an end part of a tube provided with an annular head, sealing means in the throughway to form a sealing engagement with the end part of the tube located in the throughway, a locking device engageable with the annular bead on the tube adjacent to the end part of the tube to hold the end part of the tube in the coupling body in engagement with said sealing means and means on the body to provide a resistance to entry of the tube into the throughway prior to engagement of the locking device with the tube bead so that a force applied to the tube to overcome the resistance also overcomes any resistance offered by the locking device to ensure that the tube bead is engaged with the locking device.

2. A tube coupling as claimed in claim 1, wherein the means to provide a resistance to entry of the tube into the throughway comprises a deformable member located in the throughway in the path of the tube between said sealing means and said open end of the throughway to be engaged and deformed by entry of the tube and thereby to provide resistance to entry of the tube.

3. A tube coupling as claimed in claim 2, wherein the deformable member comprises an annular component mounted in the throughway between said sealing means and the open end of the throughway and having a inner peripheral portion engageable with the tube to be deformed thereby.

4. A tube coupling as claimed in claim 3, wherein the annular element is of simple diaphragm form having a plain inner periphery to be deformed by the tube passing through the element.

5. A tube coupling as claimed in claim 3, wherein the annular element is of diaphragm form having spaced fingers or teeth around its inner periphery which are deformed by the tube passing through the annular element.

6. A tube coupling as claimed in claim 3, wherein the annular element has arcuate slots between its inner and outer peripheries to allow deformation of the element when the tube is passed through the element.

7. A tube coupling as claimed in claim 6, wherein the element has an oval shaped inner aperture to be deformed by the tube passing through the element.

8. A tube coupling as claimed in claim 6, wherein the annular element has an internal diameter smaller than the outside diameter of the tube whereby the inner portion of the element is deformed by passing the tube through the annular element.

9. A tube coupling as claimed in claim 1, wherein the locking device for holding the tube in the coupling body comprises an annular collet mounted on the coupling body having resilient fingers projecting outwardly of the coupling body to engage over and snap behind the bead on the tube to retain the tube in the coupling body, the annular portion of the collet having an internal diameter less than that of the outside diameter of the tube to provide said resistance to entry of the tube into the throughway in the coupling body.

10. A tube coupling as claimed in claim 9, wherein said coupling body includes tapered cam surface means and the collect is of dual form, having one set of resilient fingers projecting into the coupling body for engagement with said tapered cam surface means in the coupling body for gripping and engaging the tube within the coupling body and a second set of fingers projecting outwardly of the coupling body to engage and lock with the bead on the tube.

* * * * *